（12） United States Patent
Akiyama et al.

(10) Patent No.: US 7,582,371 B2
(45) Date of Patent: Sep. 1, 2009

(54) FUEL CELL SYSTEM HAVING FUEL AND WATER CONTROLLING MEANS

(75) Inventors: Takashi Akiyama, Suita (JP); Yukihiro Okada, Katano (JP); Kohji Yuasa, Hirakata (JP); Satoshi Shibutani, Hirakata (JP); Hideyuki Ueda, Ibaraki (JP)

(73) Assignee: Panasonic Corporation, Osaka (JP)

( * ) Notice: Subject to any disclaimer, the term of this patent is extended or adjusted under 35 U.S.C. 154(b) by 1008 days.

(21) Appl. No.: 10/858,048

(22) Filed: Jun. 2, 2004

(65) Prior Publication Data

US 2004/0247963 A1 Dec. 9, 2004

(30) Foreign Application Priority Data

Jun. 9, 2003 (JP) .............................. 2003-163627

(51) Int. Cl.
*H01M 8/04* (2006.01)
(52) U.S. Cl. .......................................... 429/22; 429/23
(58) Field of Classification Search ................. 435/807; 429/13, 22; 95/23
See application file for complete search history.

(56) References Cited

U.S. PATENT DOCUMENTS

| | | | | |
|---|---|---|---|---|
| 3,149,921 A * | 9/1964 | Warner | ..................... | 205/782.5 |
| 4,474,648 A * | 10/1984 | Tantram et al. | ............. | 205/783 |
| 5,650,624 A * | 7/1997 | Wong | ..................... | 250/338.5 |
| 6,090,268 A * | 7/2000 | Kunimatsu et al. | .......... | 205/782 |
| 6,303,244 B1 * | 10/2001 | Surampudi et al. | ............ | 429/17 |
| 6,497,972 B1 * | 12/2002 | Iwasaki | ........................ | 429/13 |
| 6,589,679 B1 * | 7/2003 | Acker et al. | ................... | 429/22 |
| 6,686,081 B2 * | 2/2004 | Gottesfeld | ..................... | 429/30 |
| 2002/0081468 A1 * | 6/2002 | Shioya | ........................ | 429/19 |
| 2002/0109511 A1 | 8/2002 | Frank | | |
| 2002/0148284 A1 | 10/2002 | Baldauf et al. | | |
| 2003/0110841 A1 * | 6/2003 | Zhang et al. | ................ | 73/61.76 |

FOREIGN PATENT DOCUMENTS

JP 5-258760 10/1993

OTHER PUBLICATIONS

Material Safety Data Sheet, Methanex, Oct. 13, 2005.*

* cited by examiner

*Primary Examiner*—Patrick Ryan
*Assistant Examiner*—Muhammad Siddiquee
(74) *Attorney, Agent, or Firm*—McDermott Will & Emery LLP

(57) ABSTRACT

A fuel cell system includes: a dilute tank that stores an aqueous solution of liquid fuel and supplies the solution to the anode of a fuel cell; a fuel tank connected to the dilute tank via a first controlling section; a water tank connected to the dilute tank via a second controlling section; and controlling means including a current detector which measures the amount of the fuel consumed by the fuel cell from the amount of power generation. The controlling means controls the first controlling section based on the measured amount of fuel consumption and further includes correcting means for measuring a component of a gas discharged from the cathode, calculating the amount of the fuel which has crossed over from the anode to the cathode based on the measured component, and correcting the measured amount of fuel consumption based on the calculated amount of fuel crossover.

24 Claims, 5 Drawing Sheets

F I G. 5
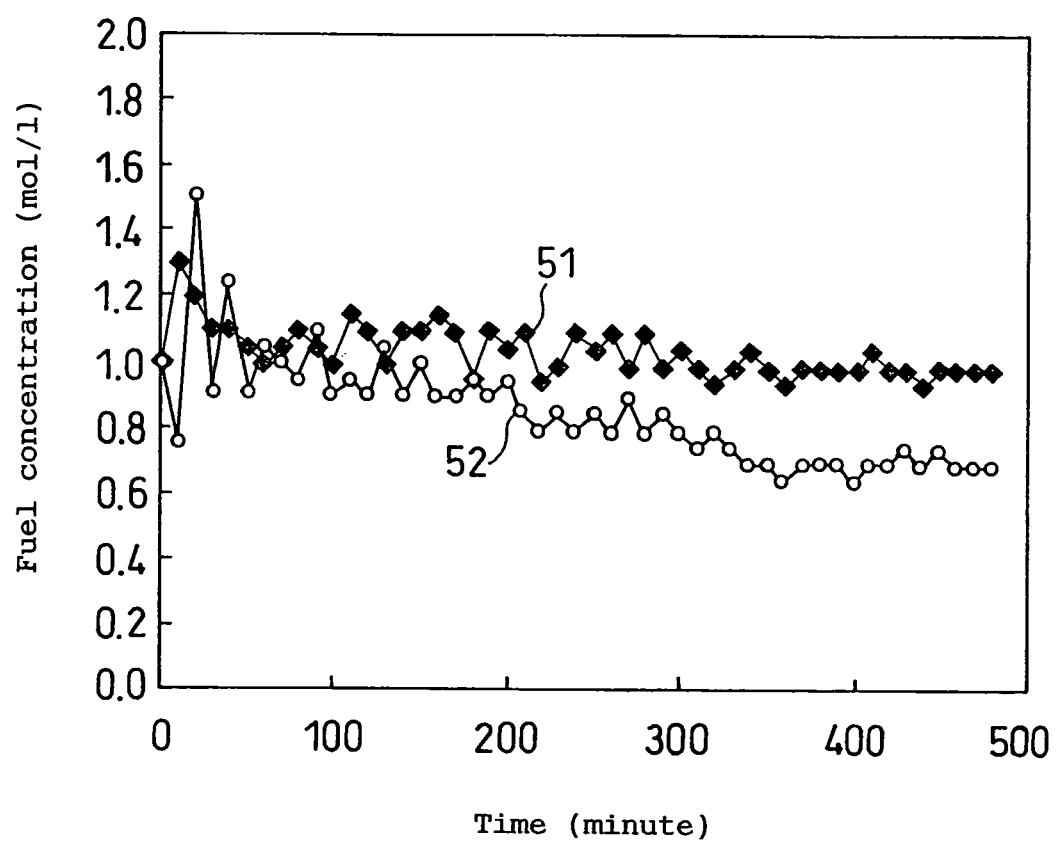

FUEL CELL SYSTEM HAVING FUEL AND WATER CONTROLLING MEANS

BACKGROUND OF THE INVENTION

The present invention relates to fuel cell systems.

Fuel cells are roughly classified into phosphoric acid type, alkaline type, molten carbonate type, solid oxide type, and solid polymer type, according to the kind of the electrolyte which they use. Among them, solid polymer fuel cells (PEFCs), which are capable of operating at low temperatures and have a high power density, are becoming commercially practical in such applications as automobile power sources and domestic cogeneration systems.

Among this type of fuel cells, direct-fuel-oxidation type fuel cells can generate electric energy by directly oxidizing fuel at the electrode, without reforming fuel that is liquid at ordinary temperature into hydrogen. Since they need no reformer and thereby permit an easy reduction in the size of power sources, they are expected to be used as the power source for various portable electronic devices. As the fuel to be fed to this type of PEFC, the use of low-molecular-weight alcohols and ethers has been examined. Most promising is methanol, which offers a high energy efficiency and a high power. Fuel cells that use methanol as the fuel are called direct methanol type fuel cells (DMFCs).

The commonly used electrolyte of PEFCs is "Nafion (trademark)", which is a perfluorocarbon sulfonic acid polymer available from E.I. Du Pont de Nemours & Co. Inc. However, the use of such a perfluorocarbon sulfonic acid polymer as the electrolyte membrane of a DMFC causes a problem called crossover phenomenon, in which the fuel undesirably permeates through the electrolyte membrane to the cathode, significantly decreasing output voltage.

Therefore, research and development of DMFCs has been focused on the development of an electrolyte membrane that would enable a significant reduction in fuel crossover. However, the reduction in crossover currently represents a tradeoff for proton conductivity. Hence, an electrolyte membrane that realizes both reduced crossover and high proton conductivity and is suited for DMFCs has yet to be developed.

The reaction occurring at the anode of a DMFC is a reaction of fuel with water, as expressed in formula (1), whereas the reaction at the cathode is a reaction of water production from protons and oxygen, as expressed in formula (2).

$$CH_3OH + H_2O \rightarrow CO_2 + 6H^+ + 6e^- \quad (1)$$

$$3/2 O_2 + 6H^+ + 6e^- \rightarrow 3H_2O \quad (2)$$

As can be seen from the above reaction formulae, it is ideal to supply the anode with a solution containing equimolar methanol and water, i.e., a 50 mol % aqueous solution of methanol. However, since the occurrence of methanol crossover is mainly due to the molecular diffusion caused by the concentration gradient of the methanol aqueous solution within the electrolyte membrane, the crossover decreases with the decrease in the concentration of the methanol aqueous solution supplied to the anode. It is therefore necessary to make the concentration of the methanol aqueous solution, supplied to the anode, lower than the stoichiometric quantity of 50 mol % as derived from formula (1), in order to maximize the output of currently available DMFCs.

However, storing a low-concentration methanol aqueous solution as fuel inside a fuel cell system leads to a decrease in volume energy efficiency, which is a fatal degradation in performance.

In view of this problem, Japanese Laid-Open Patent Publication No. Hei 5-258760 proposes a system that has a fuel tank for storing a pure fuel, a water tank, and a dilute fuel tank for storing a dilute fuel aqueous solution, such that the fuel concentration in the dilute fuel tank is controlled.

The methanol concentration in an aqueous solution can be determined by measuring, for example, the density, refractive index, or conductivity of the aqueous solution, but these measurement methods have associated problems, such as slow response speed, poor accuracy, impurity-induced errors, respectively. There are also some other methods that have been developed recently, such as measurement of transmitted infrared rays and measurement of ultrasound velocity, and instruments that measure concentration utilizing these methods are commercially available. Other proposed methods include a method utilizing the difference in heat capacity between water and fuel (Japanese Unexamined Patent Publication 2003-511833) and a method measuring the capacitance of fuel and electrolyte (Japanese Unexamined Patent Publication 2003-507859).

For the above-mentioned direct-fuel-oxidization type fuel cells, maintaining and controlling the dilute fuel concentration is indispensable to achieve stable performance. However, as described above, according to the methods of directly measuring the dilute fuel concentration, the measurement accuracy is insufficient or unstable, and concentration maintenance/control is difficult for the following two reasons.

The first reason is the influence of temperature. Generally, the values of physical properties of liquid, such as density, conductivity, and sound velocity, vary depending on temperature. It is thus necessary to accurately measure the temperature of the liquid and make a correction based on the measured value, in order to determine the concentration. However, the temperature of the fuel to be supplied to the dilute tank of a fuel cell is not necessarily the same as the temperature of the dilute fuel aqueous solution in the dilute tank. Specifically, during the time from the supply of the fuel into the dilute tank until the temperature of the dilute fuel aqueous solution becomes uniform within the dilute tank, the determination of concentration inevitably involves errors. Also, when polar solvents, such as methanol and water, are mixed, heat of mixing occurs, thereby further adding to temperature variation.

The second reason is the inclusion of impurities. For example, in a direct-fuel-oxidization type fuel cell system utilizing methanol as the fuel, carbon dioxide is generated at the anode, as shown in formula (1). Although most of the generated carbon dioxide is discharged to the outside in the form of gas, part of it dissolves in the fuel aqueous solution, because carbon dioxide dissolves in water in considerably large amounts. Also, particularly in the electrochemical reaction of methanol catalytic oxidation, it is known that formaldehyde and formic acid are generated as by-products, although in very small amounts, and they dissolve readily in the fuel aqueous solution near the electrode. The dissolution of such impurities in the fuel aqueous solution causes a change in the values of most physical properties that are utilized for measuring the concentration, such as density, conductivity, and sound velocity.

Generally speaking, with direct-fuel-oxidation type fuel cells, it is difficult for all the fuel aqueous solution supplied to their respective cells from the dilute tank to contribute to the electrode reaction, so the un-reacted fuel is often collected for reuse. Specifically, the fuel aqueous solution discharged from the electrodes is forced to return to the fuel dilute tank, so that it is used repeatedly. When the fuel is reused, the amount of the above-mentioned impurities included in the fuel aqueous solution increases as the operation of the fuel cell system continues. Therefore, the dissolution of carbon monoxide, formaldehyde, and formic acid into the fuel aqueous solution continues until it reaches saturation.

The two problems mentioned above are unavoidable in measuring liquid concentration. It is accordingly difficult to maintain and control the fuel concentration in the dilute tank of direct-fuel-oxidation type fuel cells in a stable manner, by directly measuring the fuel concentration in the dilute tank.

BRIEF SUMMARY OF THE INVENTION

In view of the problems described above, the present invention provides a fuel cell system that includes controlling means capable of accurately controlling the amounts of fuel and water to be supplied to a dilute tank without directly measuring the fuel concentration in the dilute tank.

In one aspect, the present invention provides a fuel cell system comprising: a fuel cell including a unit cell that comprises a polymer electrolyte membrane sandwiched between an anode and a cathode; means for supplying an oxidant gas to the cathode of the fuel cell; a dilute tank that stores an aqueous solution of liquid fuel and circulates the aqueous solution between the anode of the fuel cell and the dilute tank; a fuel tank connected to the dilute tank via a first controlling section; a water tank connected to the dilute tank via a second controlling section; a gas detector that measures a component of a gas discharged from the cathode of the fuel cell and outputs a measured result; a current detector that measures the amount of power generated by the fuel cell and outputs a measured result; and a controller that controls the first controlling section and the second controlling section based on the results outputted by the gas detector and the current detector.

In another aspect, the present invention provides a fuel cell system comprising: a fuel cell including a unit cell that comprises a polymer electrolyte membrane sandwiched between an anode and a cathode; means for supplying an oxidant gas to the cathode of the fuel cell; a dilute tank that stores an aqueous solution of liquid fuel and supplies the aqueous solution to the anode of the fuel cell; a fuel tank connected to the dilute tank via a first controlling section; a water tank connected to the dilute tank via a second controlling section; a gas detector that measures a component of a gas discharged from the cathode of the fuel cell and outputs a measured result; a current detector that measures the amount of power generated by the fuel cell and outputs a measured result; an unspent fuel detector that measures unspent fuel discharged from the anode of the fuel cell and outputs a measured result; and a controller that controls the first controlling section and the second controlling section based on the results outputted by the gas detector, the current detector, and the unspent fuel detector.

It is preferable that the gas detector measure the flow rate of the gas together with the component of the gas and outputs measured results.

In one embodiment of the invention, it is preferable that the gas detector measure the concentration of carbon dioxide in the gas. The concentration of carbon dioxide is preferably measured utilizing infrared absorption.

In another embodiment of the invention, the gas detector measures the concentration of oxygen in the gas.

In still another embodiment of the invention, the gas detector measures the concentration of steam in the gas.

In still further embodiment of the invention, the gas detector measures the concentration of at least one selected from the group consisting of methanol, formaldehyde, formic acid, and carbon monoxide.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE SEVERAL VIEWS OF THE DRAWING

FIG. 5 is a graph showing the changes with time in fuel concentration in the dilute tank of Example 1 of the invention and Comparative Example 1.

DETAILED DESCRIPTION OF THE INVENTION

Figure 1:
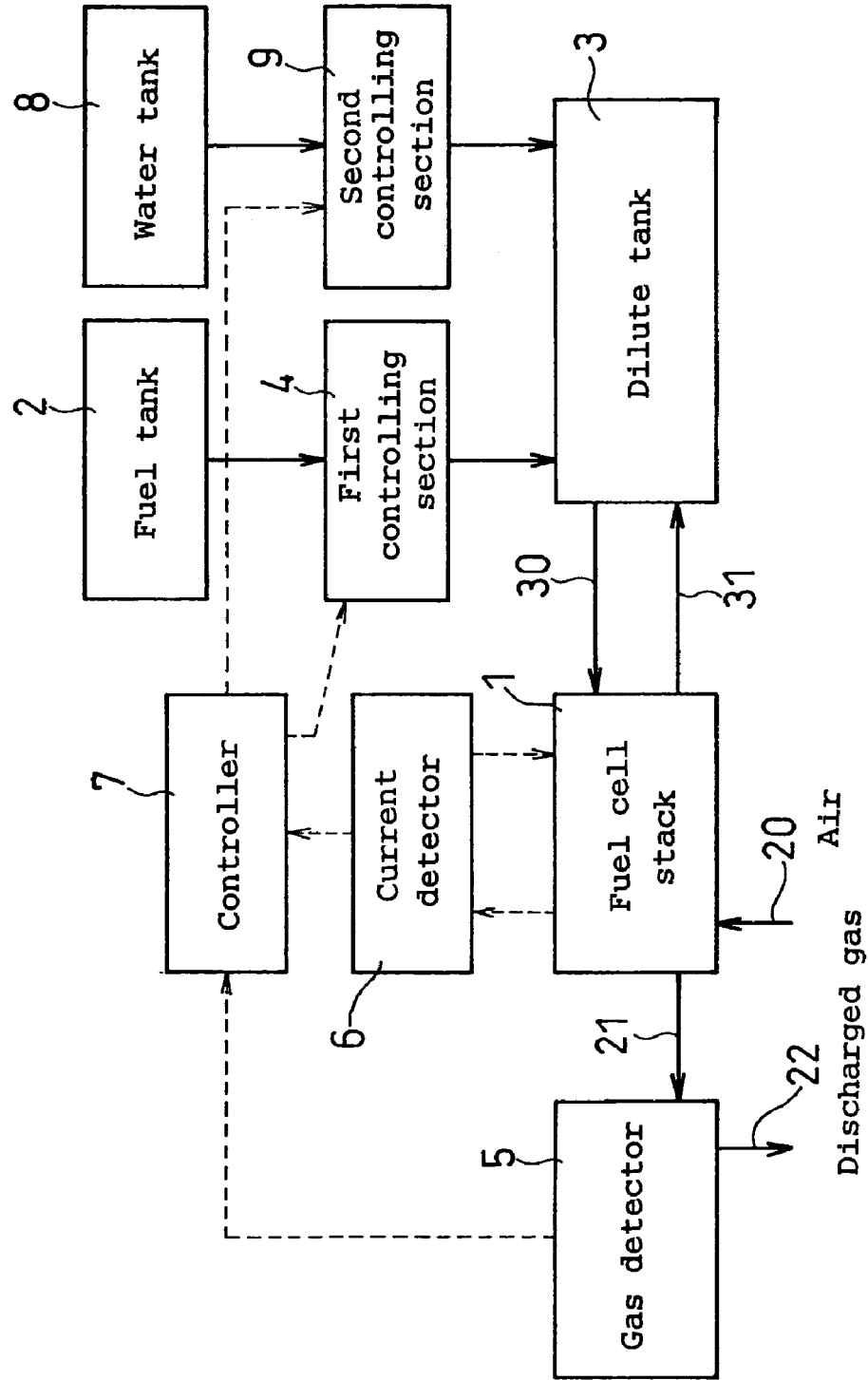
FIG. 1 is a block diagram showing the schematic structure of a fuel cell system in Embodiment 1 of the invention.

The present invention relates to a fuel cell system comprising: a fuel cell including a unit cell that comprises a polymer electrolyte membrane sandwiched between an anode and a cathode; means for supplying an oxidant gas to the cathode of the fuel cell; a dilute tank that stores an aqueous solution of liquid fuel and supplies the aqueous solution to the anode of the fuel cell; a fuel tank connected to the dilute tank via a first controlling section; a water tank connected to the dilute tank via a second controlling section; and controlling means including a current detector.

The current detector measures the amount of the fuel consumed by the fuel cell from the amount of power generated by the fuel cell. Based on the measured amount of fuel consumption, the controlling means controls the first controlling section. The controlling means further includes correcting means for measuring a component of a gas discharged from the cathode of the fuel cell, calculating the amount of the fuel which has crossed over from the anode to the cathode based on the measured component, and correcting the measured amount of fuel consumption based on the calculated amount of the fuel which has crossed over.

The amount of the fuel consumed by the fuel cell is provided by a current detector which measures the amount of power generated by the fuel cell and outputs a measured result.

One of the features of the invention is that the amount of the fuel which has crossed over the polymer electrolyte membrane from the anode to the cathode is determined by measuring a component of a gas discharged from the cathode of the fuel cell.

In a first system in which the fuel aqueous solution is circulated between the anode of the fuel cell and the dilute tank, the amount of the fuel consumed by the fuel cell is the sum of the fuel which has contributed to the power generation measured by the current detector and the amount of the fuel which has crossed over.

In the first system, the amount of water consumed by the fuel cell can also be calculated from the output of the current detector. Thus, based on the calculated value, the second controlling section can be controlled such that an appropriate amount of water is fed to the dilute tank.

In a second system in which the fuel aqueous solution is discharged from the anode of the fuel cell without being reused, the unspent fuel discharged from the anode needs to be measured in addition to the amount of the fuel measured by the first system, in order to obtain the total amount of fuel consumption.

The second system has a discharged fuel detector that measures the fuel in the aqueous solution discharged from the anode of the fuel cell. This detector includes a combustor and a gas detector. The amount of the unspent fuel discharged from the fuel cell can be determined by introducing the discharged solution containing the unspent fuel into the combustor to completely oxidize the unspent fuel, and measuring a component of the gas discharged from the combustor. The unspent fuel may be completely oxidized either in the form of liquid or in the form of steam. In the second system, the second controlling section can be controlled so as to feed an appropriate amount of water to the dilute tank, based on the amount of fuel consumption, without measuring the amount of water consumed by the fuel cell.

As described above, the present invention provides a fuel cell system capable of accurately controlling the amounts of fuel and water to be supplied to a dilute tank without directly measuring the fuel concentration in the dilute tank.

Referring now to drawings, embodiments of the invention are described in detail.

Embodiment 1

FIG. 1 is a block diagram showing the schematic structure of a fuel cell system in a preferable embodiment of the invention. This fuel cell system is equipped with a fuel cell stack 1 and a dilute tank 3 that stores a fuel aqueous solution. A fuel tank 2 stores methanol, which is fuel. The fuel supply path of the fuel tank 2 is connected to the dilute tank 3 via a first controlling section 4, which controls the supply amount of methanol. A water tank 8 stores water for diluting methanol. The water supply path of the water tank 8 is connected to the dilute tank 3 via a second controlling section 9, which controls the supply amount of water.

The fuel cell stack 1 consists of a plurality of direct-fuel-oxidation type unit cells connected in series, and each unit cell is composed of a hydrogen-ion conductive polymer electrolyte membrane sandwiched between an anode and a cathode. The fuel aqueous solution is fed to the anodes of the respective unit cells in parallel from an inlet-side fuel manifold and discharged into an outlet-side fuel manifold. The inlet-side fuel manifold and the outlet-side fuel manifold are connected to the inlet and outlet of the dilute tank 3, respectively. Thus, the fuel aqueous solution in the dilute tank 3 is fed to the fuel cell stack 1, as shown by reference character 30, and the discharged solution returns to the dilute tank 3, as shown by reference character 31. The fuel aqueous solution is fed and returned to the dilute tank 3 by appropriate driving means which is not shown in FIG. 1.

Air is fed to an inlet-side manifold of the fuel cell stack 1 by appropriate air supply means, as shown by reference character 20. The air is then fed to the cathodes of the respective unit cells in parallel and is discharged from an outlet-side manifold. As shown by reference character 21, the discharged gas is introduced into a gas detector 5, where the component and flow rate of the gas are measured. Thereafter, the gas is discharged from the gas detector 5, as shown by reference character 22.

A current detector 6 measures the output current to determine the amount of power generated by the fuel cell stack 1. The gas detector 5 and the current detector 6 output the measurement results, which are then inputted to a controller 7. Based on the input signals, the controller 7 outputs signals to the first controlling section 4 and the second controlling section 9, to control the amounts of methanol and water to be fed to the dilute tank 3.

The functions of the gas detector and the current detector in the above-described fuel cell system are detailed below.

In the above-described system in which the fuel aqueous solution is circulated between the anode of the fuel cell and the dilute tank, it is important to accurately measure the amounts of fuel and water consumed. As shown in formula (1), in the electrochemical reaction, the amount of methanol (fuel) consumed at the anode can be determined by calculating the number of generated electrons from the measured amount of current generated. However, in many of the currently available direct-fuel-oxidation type fuel cells, particularly DMFCs, fuel is consumed in excess, because of fuel crossover in which fuel permeates through the electrolyte membrane from the anode to the cathode. It is therefore indispensable to accurately determine the amount of crossover, in order to accurately determine the amount of fuel consumption.

If methanol crosses over the electrolyte membrane to the cathode, it comes into contact with the cathode catalyst, so that it is readily oxidized by the oxidizing gas present on the cathode side. This reaction is represented by formula (3):

$$CH_3OH + 3/2 O_2 \rightarrow CO_2 + 2H_2O \qquad (3)$$

As shown in the above formula (3), part of the fuel which has crossed over is not oxidized to carbon dioxide, with the production of carbon monoxide as a byproduct, but the amount of the carbon monoxide is extremely small, compared to the amount of the carbon dioxide. Therefore, the amount of methanol crossover can be determined by accurately measuring the concentration of the carbon dioxide in the gas discharged from the cathode, subtracting therefrom the concentration of the carbon dioxide in the air supplied to the cathode to obtain the difference in carbon dioxide concentration before and after the cathode passage, and calculating the amount of carbon dioxide per unit time from the gas flow rate on the cathode side.

With respect to the gas flow rate on the cathode side, which is an important element as a parameter of the operating conditions of DMFCs, it is often controlled to a predetermined value. Thus, this value can be used for the above calculation. However, it is effective to measure the flow rate, in order to further enhance the measurement accuracy. In this case, it is preferred to measure the flow rate of the gas discharged from the cathode, rather than to measure the flow rate of the gas supplied to the cathode, for the following reason. As shown by formula (3), from 3/2 mol of oxygen supplied to the cathode, 1 mol of carbon dioxide is produced. Most of the water produced simultaneously is discharged in the form of liquid from the cell at temperatures lower than 100° C. Hence, the flow rate of the gas discharged from the cathode is lower than the flow rate of the gas supplied to the cathode.

As described above, by measuring the concentration of the carbon dioxide in the gas discharged from the cathode and further measuring the flow rate of the gas discharged from the cathode, the amount of methanol crossover and, consequently, the amount of methanol consumption can be determined accurately.

However, when the cell operating temperature is higher than 100° C., or when it is relatively high even under 100° C., the steam of generated water remarkably heightens the humidity of the discharged gas, thereby resulting in a decrease in the measurement accuracy of carbon dioxide concentration and an increase in the flow rate. It is accordingly preferred to cool the discharged gas, for example, by a heat exchanger, before measuring the carbon dioxide concentration and the gas flow rate. Alternatively, the discharged gas may be measured by a concentration meter having the function of removing moisture for measurement.

Also, the amount of oxygen consumption varies depending on the amount of the methanol which has crossed over, as described above. Therefore, instead of measuring the carbon dioxide concentration, it is also possible to measure the oxygen concentration in the gas discharged from the cathode and obtain the difference between the measured oxygen concentration and the oxygen concentration of the supplied air, in order to determine the amount of crossover.

Alternatively, in order to more accurately measure the amount of crossover, the concentration of steam, i.e., humidity, as well as the carbon dioxide concentration, may be measured. Also, the carbon monoxide concentration may be measured simultaneously, to correct the amount of crossover.

Other components of the discharged gas may be additionally measured for the following safety reasons. Under the typical operating conditions of DMFCs, the amount of air supplied to the cathode is significantly more excessive than the stoichiometric quantity as derived from formulae (2) and (3). However, under such conditions, if the electrolyte membrane breaks or if the device that supplies gas to the cathode causes trouble, the amount of methanol crossover may exceed the amount of the oxygen supplied. Consequently, the amount of carbon monoxide produced may be increased, or large amounts of methanol steam may be included in the gas discharged from the cathode. Thus, there is a danger that these carbon monoxide and methanol steam may be discharged from the fuel cell system together with the discharged gas.

Meanwhile, as mentioned above, formaldehyde and formic acid are generated as the by-products of the reactions of DMFCs, and most of them is thought to be dissolved in the water present on the electrodes. In the event of disappearance of the water or an excessive increase in temperature due to some kind of trouble, formaldehyde and formic acid may evaporate and dissolve in the gas discharged from the cells. Since carbon monoxide, methanol, formaldehyde, and formic acid are substances that have an adverse effect on one's health, the release of such substances to the outside of the system is not preferable.

Therefore, it is preferred to measure the concentrations of carbon monoxide, methanol, formaldehyde, and formic acid, and if the measured concentrations exceed the predetermined threshold limit values, to stop the first controlling section 4 supplying the fuel under the control of the controller 7, in order to stop the power generation of the fuel cell.

The gas detector 5 may be of any configuration, if it is capable of measuring the gas concentration and outputting signals correlated with the measured values to the controller 7. As described above, in measuring the concentration of a gas consisting of a plurality of components, a plurality of gas concentration meters each of which measures one component may be used together. Alternatively, a gas concentration meter capable of measuring a plurality of components may be used alone, or a plurality of such concentration meters may be used.

Gas concentration meters utilizing infrared absorption are highly responsive, and in addition, highly accurate. They are capable of distinguishing substances of different chemical bond species, such as carbon dioxide, carbon monoxide, and methanol, even if they are coexistent, because such substances have different absorption wavelengths.

The fuel cell stack 1 includes: a power generating section consisting of an electrolyte membrane sandwiched between an anode and a cathode; a diffusion section arranged on each side of the power generating section for evenly diffusing a fuel or oxidant gas to the electrode; and a separator that separates the fuel from the oxidant gas. Although a fuel cell may consist of one unit cell, it is usually used in the form of a cell stack consisting of a plurality of electrically connected unit cells that are stacked or arranged in parallel.

The fuel tank 2 may be of the cartridge type such that the fuel tank 2 can be removed from the fuel cell system when it becomes empty and can be replaced with a tank filled with fuel. Also, the fuel tank 2 desirably contains pure fuel in consideration of volume efficiency, but it may contain fuel that is diluted with water beforehand.

The dilute tank 3 is, without limitation, illustrated as one tank in FIG. 1. However, the dilute tank 3 may be of the type such that the tank is located so as to contact the anode and therefore the liquid in the tank can be directly fed into the anode. Alternatively, it may be either of the circulation type, in which the fuel that has not been consumed at the electrode is forced to return to the dilute tank 3 for reuse, or of the non-circulation type, in which all the fuel supplied from the dilute tank 3 or the fuel tank 2 is consumed or discarded.

The first controlling section 4 may be any device capable of controlling the amount of fuel supply by the signals from the controller 7. Specifically, it may be a valve that controls the flow of fuel in an on-off manner, or a massflow controller that controls the flow rate of fluid in a continuous manner. Alternatively, it may be a device that also serves as fuel supply means, or a liquid pump capable of changing the discharge amount freely.

The current detector 6 may be any device capable of measuring the current and outputting signals correlated with the measured values to the controller 7. It may be an electric current meter to be connected to a circuit in series, or a clamp meter in the state of non-connection.

The controller 7 calculates the total amount Z of methanol consumption in the following manner. First, the controller 7 calculates the amount X of methanol consumed by the electrode reaction, from the current value outputted from the current detector 6 or the numerical value A contained in the signal that is correlated with the current value. The controller 7 also calculates the amount Y of methanol consumed by the crossover, from the concentration outputted from the gas detector 5 or the numerical value B contained in the signal that is correlated with the concentration. The sum of the amount X and the amount Y is the amount Z of methanol consumption. Thus, the controller 7 may be any apparatus capable of performing such calculations and outputting a signal W that gives to the first controlling section 4 an instruction to feed the amount of methanol equivalent to the amount Z of methanol consumption from the fuel tank 2 to the dilute tank 3.

Since the amount X of methanol consumption is proportional to the current value, equation (4) applies. The computing equation of the amount Y of methanol consumption varies depending on the substance to be measured by the gas detector 5. This computing equation is given by equation (5) if the numerical value B is the concentration C of carbon dioxide only, while it is given by equation (6) if the flow rate D of the discharged gas from the cathode is measured in order to improve accuracy.

$$X = aA \text{ (a is a constant)} \tag{4}$$

$$Y = b(C-c) \text{ (b and c are constants)} \tag{5}$$

$$Y = d(C \times D - e) \text{ (d and e are constants)} \tag{6}$$

$$Z = X + Y \tag{7}$$

In direct-fuel-oxidation type fuel cells, water is also consumed by the electrochemical reaction of the anode, as shown by formula (1). Thus, in addition to fuel, there is a need to resupply the amount of water equivalent to the amount of water consumed. With respect to the resupply of water, the water produced at the cathode by the reaction of formula (2) or (3) may be caused to diffuse through the electrolyte membrane to the anode, to dilute the fuel concentration near the anode. However, under the present condition where methanol crossover frequently occurs, the fuel concentration is often set to a very low level. It is therefore common to adopt a system configuration of providing the water tank 8 for dilution.

The amount of water consumption is also calculated from the current value and the gas component at the cathode, just like the case of methanol. That is, as shown by formula (1), there is a stoichiometric correlation between the amount of electrons produced and the amount of water molecules that have reacted at the electrode, so that the amount of water consumption can be determined from the value of the current generated. Besides, generally speaking, water is also consumed by the movement of water through the electrolyte membrane from the anode to the cathode, like methanol. This phenomenon of movement is attributed to both the molecular diffusion of water itself and the electro-osmotic drag of water by the protons moving through the electrolyte membrane from the anode to the cathode. Consequently, at the cathode is the water moving from the anode, in addition to the water generated by the reactions of formulae (2) and (3). Such water is discharged by the air supplied to the cathode, partly in the form of steam, and partly in the form of liquid.

The amount of water consumption can be determined, for example, by the following two methods, which may be effectively selected according to the water content of the cathode.

One method determines the amount of water moving from the anode to the cathode, from the amount of methanol crossover. That is, with respect to the above-mentioned phenomenon of water movement, the one due to molecular diffusion correlates with the amount of methanol crossover, while the one attributable to electro-osmotic drag correlates with the amount of protons which have moved, i.e., the amount of current generated. Therefore, the amount of water consumed at the anode can be determined by experimentally finding these correlations and measuring the amount of methanol crossover by, for example, the method of measuring the concentration of carbon dioxide discharged from the cathode.

The other method measures the concentration of steam in the gas discharged from the cathode. Although it is also dependent on temperature, pressure, gas flow rate, etc., the concentration of steam in the gas discharged from the cathode correlates with the water content of the cathode in a steady state where the operating conditions are invariable. Therefore, the steam concentration also correlates with the amount of water moving from the anode to the cathode.

With respect to the water to be contained in the water tank 8, water may be supplied from the outside of the fuel cell system into the water tank 8, or the water produced at the cathode may be stored in the water tank 8. Also, the water tank 8 may be of the cartridge type such that the water tank 8 can be removed from the fuel cell system when it becomes empty and can be replaced with a tank filled with water.

The second controlling section 9 may be any device capable of controlling the amount of water supply by the signals from the controller 7. Specifically, it may be a valve that controls the flow of water in an on-off manner, or a massflow controller that controls the flow rate of fluid in a continuous manner. Alternatively, it may be a device that also serves as water supply means, or a liquid pump capable of changing the discharge amount freely.

The controller 7 calculates the amount T of water consumed at the anode, from the current value outputted from the current detector 6 or the signal A correlated with the current value, and from the concentration outputted from the gas detector 5 or the signal B correlated with the concentration. Thus, the controller 7 may be any apparatus capable of performing such calculation and outputting a signal that gives to the second controlling section 9 an instruction to feed the amount of water equivalent to the consumption amount T from the water tank 8 to the dilute tank 3. It should be noted that the amount T of water consumption is the sum of the amount of water consumed by the electrode reaction at the anode and the amount S of water that has moved from the anode to the cathode. As can be seen from formula (1), the former amount is equal to the amount X of methanol consumed at the anode. The latter amount S consists of the amount due to molecular diffusion (i.e., the amount correlated with the amount Y of methanol crossover) and the amount attributable to electro-osmotic drag (i.e., the amount correlated with the current value), as described previously. Accordingly, the following computing equations apply.

$$T = X + S \tag{8}$$

$$S = fY + gA \text{ (f and g are constants)} \tag{9}$$

Embodiment 2

Figure 2:
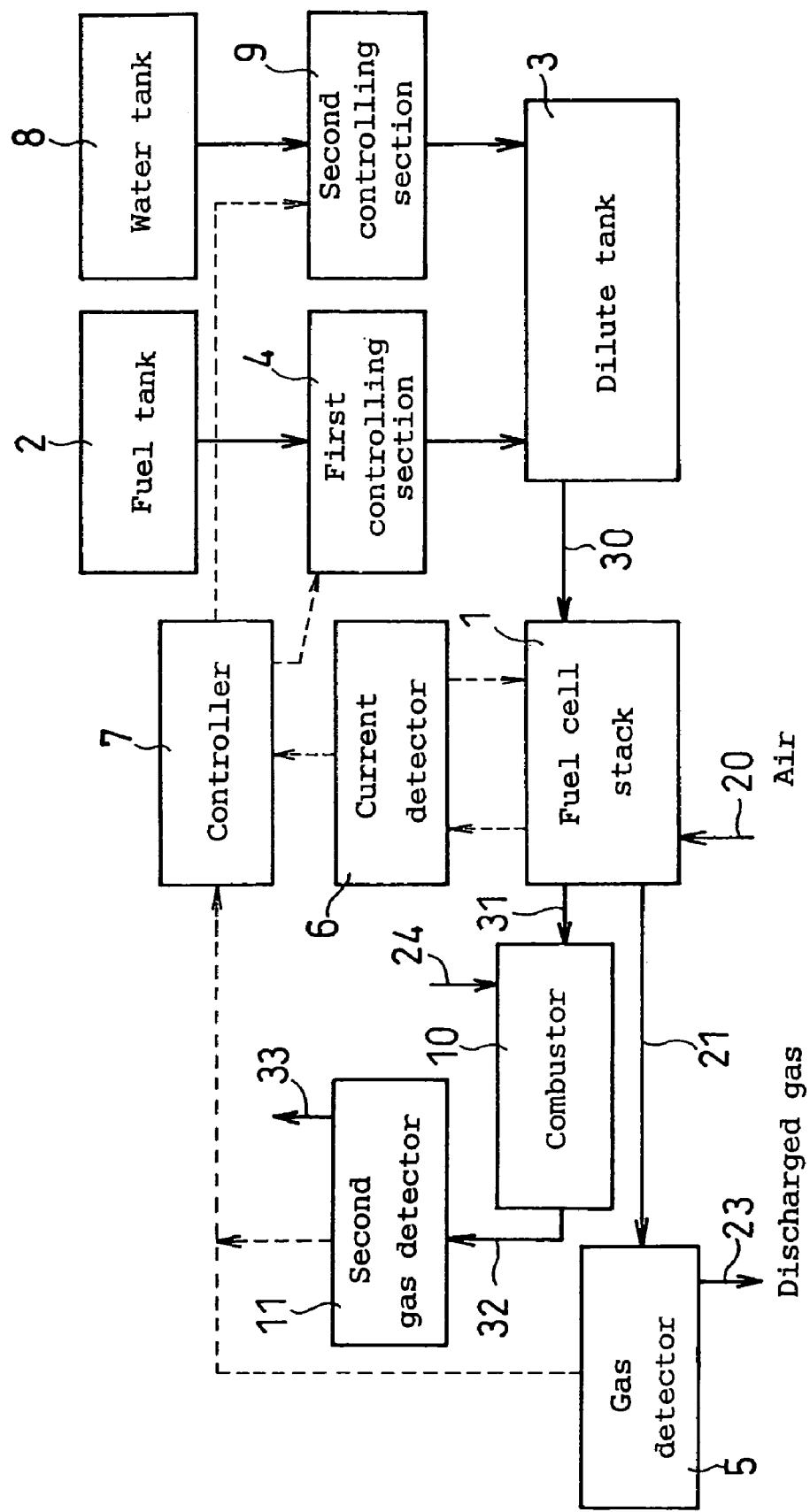
FIG. 2 is a block diagram showing the schematic structure of a fuel cell system in Embodiment 2 of the invention.

FIG. 2 is a diagram showing the schematic structure of a fuel cell system of this embodiment.

This fuel cell system is different from that of Embodiment 1 in that an aqueous solution 31 discharged from the anode of a fuel cell stack 1 and containing unspent surplus fuel is oxidized by a combustor 10 without being returned to a dilute tank 3. The combustor 10 is fed with air that contains a sufficient amount of oxygen, as shown by reference character 24. The surplus fuel introduced into the combustor 10 is completely oxidized to carbon dioxide by the reaction represented by formula (3). If all the surplus fuel is oxidized to carbon dioxide, the concentration of carbon dioxide in a gas 32 discharged from the combustor 10 correlates with the amount of surplus fuel. Therefore, the carbon dioxide in the gas 32 discharged from the combustor 10 may be measured to obtain the amount of fuel consumption, and a second gas detector 11 is provided for this purpose. Reference character 33 represents a gas discharged from the second gas detector 11.

With the fuel cell system as described above, the total amount Z of fuel consumption is the sum of the amount X of fuel consumed by power generation, the amount Y of fuel consumed by crossover, and the amount V of fuel discharged as the surplus fuel. This is represented by the following computing equations (10) to (12), wherein E is the concentration of carbon dioxide outputted from the second gas detector 11, and F is the flow rate of the gas discharged from the combustor 10.

$$V=k(E-m) \text{ (k and m are constants)} \quad (10)$$

$$V=n(E \times F-p) \text{ (n and p are constants)} \quad (11)$$

$$Z=X+Y+V \quad (12)$$

The combustor 10 may be of any type capable of completely oxidizing the surplus fuel, but combustion by fire is not suitable for use as the power source of portable, small-sized devices, in terms of heat management. Thus, the combustor 10 is preferably a catalytic combustor utilizing, for example, a platinum catalyst.

In this embodiment, the amount of water to be fed to the dilute tank may be determined in correspondence with the amount of fuel to be fed to the dilute tank.

Embodiment 3

Figure 3:
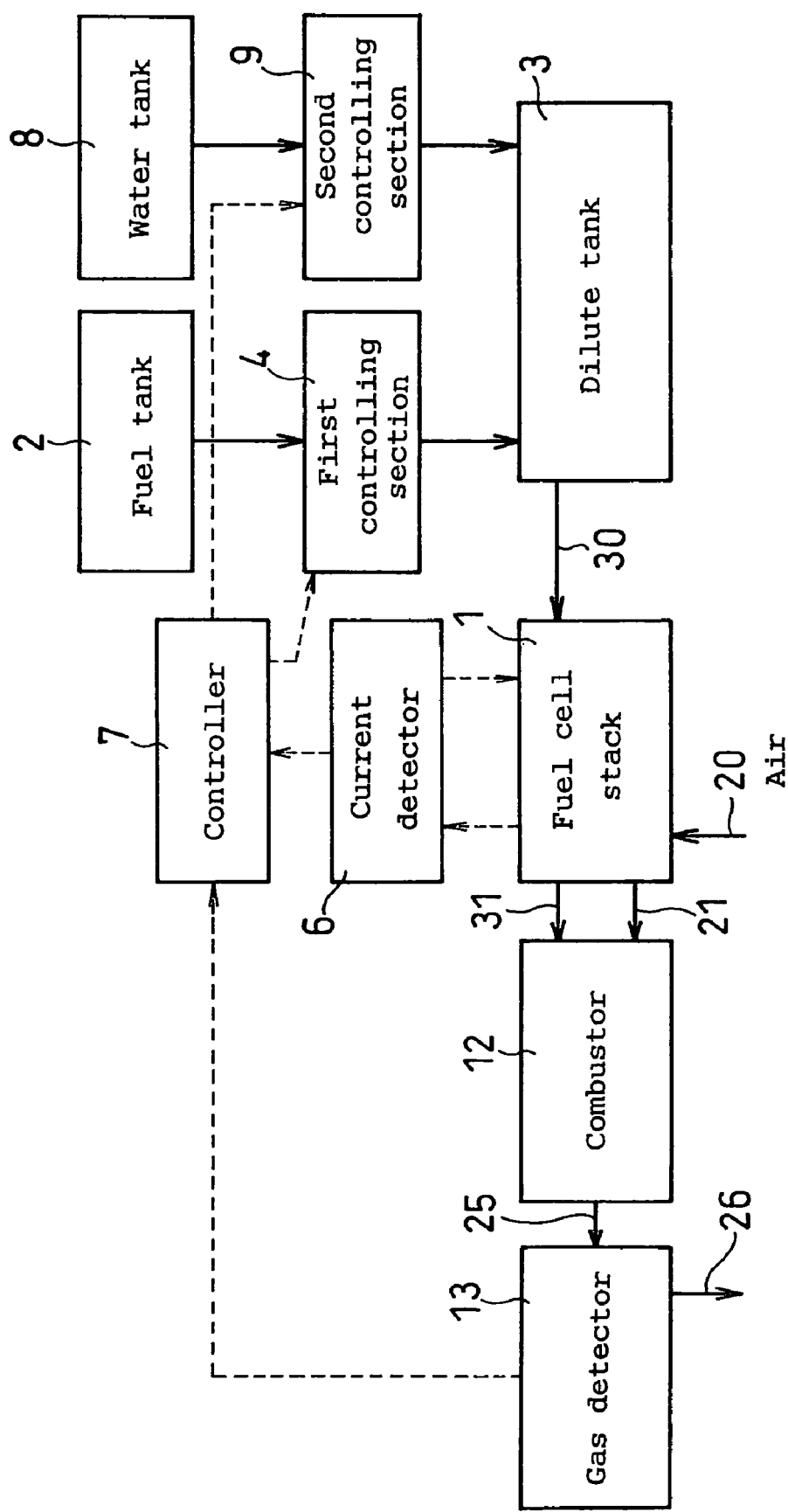
FIG. 3 is a block diagram showing the schematic structure of a fuel cell system in Embodiment 3 of the invention.

FIG. 3 is a diagram showing the schematic structure of a fuel cell system in this embodiment.

This embodiment is a simplified one of Embodiment 2. A combustor 12 burns an unspent fuel aqueous solution discharged from a fuel cell stack 1. The combustor 12 is fed, as an oxidant gas, with a gas 21 discharged from the cathode of the fuel cell stack 1, instead of air from the outside.

Under the typical operating conditions of fuel cells, air is fed to the cathode in an amount that is greater than the amount of oxygen necessary for the power generation reaction represented by the reaction formula (2), in order to maintain the oxygen partial pressure at the cathode high and promptly discharge the water produced at the cathode. Thus, the gas discharged from the cathode contains large amounts of oxygen, i.e., the discharged gas contains sufficient oxygen for oxidizing the surplus fuel.

In this embodiment, since the gas discharged from the cathode is fed to a gas detector 13 through the combustor 12, there is no need to provide a plurality of gas detectors. Accordingly, the amount of carbon dioxide measured by the gas detector 13 is the sum of the amount Y of fuel consumed by crossover and the amount V of surplus fuel. Thus, the computing equations for obtaining the amount Z of fuel consumption are as follows, and computing equations (4) and (12) can be applicable as they are.

$$Y+V=q(E-r) \text{ (q and r are constants)} \quad (13)$$

$$Y+V=s(E \times F-t) \text{ (s and t are constants)} \quad (14)$$

Embodiment 4

Another embodiment of the invention is described below.

First, it can be seen from formulae (1) and (2) that the whole reaction formula of a fuel cell is represented by formula (3). This indicates that the amount of oxygen consumed in the fuel cell correlates with the amount of fuel consumption based on formula (3), and therefore, that there is no need to distinguish between the amount of power generation and the amount of crossover. Accordingly, the amount of fuel consumption can be determined by measuring the concentration of oxygen instead of measuring the concentration of carbon dioxide in the gas discharged from the fuel cell stack. This is also applicable in such cases as described in Embodiments 2 and 3 where the surplus fuel is burned and oxidized.

However, in this embodiment, since an excessive amount of air is supplied, the amount of change in oxygen concentration is relatively small, in comparison with the cases of measuring the carbon dioxide concentration of which change is large. Thus, the measuring accuracy of this embodiment may lower. It is therefore preferable in employing this embodiment that the amount of air supply be close to the minimum amount of air supply calculated from the necessary amount of oxygen. Further, with respect to the measuring accuracy of gas concentration meters that are generally commercially available at present, oxygen concentration meters are less accurate than carbon dioxide concentration meters. In order to complement these drawbacks, it is preferred to heighten the accuracy by measurements other than concentration measurement, for example, by accurately measuring the gas flow rate.

In this embodiment, the computing equation applied to the fuel cell system of FIG. 1 is as follows. The amount Z of fuel consumption is derived from the following equation, wherein G is the oxygen concentration and H is the gas flow rate, both at the gas detector 22 that measures the gas discharged from the cathode of the fuel cell stack.

$$Z=u(G \times H-v) \text{ (u and v are constants)} \quad (15)$$

Further, the computing equation applied to the fuel cell system of FIG. 2 is given by the following equation, wherein J is the oxygen concentration and K is the gas flow rate, both at the second gas detector 11 that measures the gas discharged from the combustor 10.

$$Z=w(G \times H+J \times K-x) \text{ (w and x are constants)} \quad (16)$$

The invention is now specifically described by way of examples.

EXAMPLE 1

Using methanol as fuel, a fuel cell system as illustrated in FIG. 1 was produced. This system was operated in the following manner, and the change in the concentration of fuel in the dilute tank 3 with time was measured by a gas chromatograph (GC-14B, manufactured by Shimadzu Corporation).

The fuel cell was produced as follows.

First, a cathode catalyst-carrying powder was prepared by placing 50% by weight of platinum on a conductive carbon powder having a mean primary particle size of 30 nm. An anode catalyst-carrying powder was prepared by placing 50% by weight of a platinum-ruthenium alloy on a carbon powder having the same size as that of the cathode catalyst-carrying powder. The atomic ratio of this platinum-ruthenium alloy was 1:1. Each of these catalyst powders was mixed with a hydrogen-ion conductive polymer electrolyte, to form a catalyst paste. The weight ratio of the carbon contained in the catalyst-carrying powder to the hydrogen-ion conductive polymer electrolyte was 1:1.

Subsequently, the anode and cathode catalyst pastes were printed on both sides of a hydrogen-ion conductive polymer electrolyte membrane (Nafion 117, manufacture by E.I. Du Pont de Nemours & Co. Inc.), respectively. A carbon paper serving as a gas diffusion layer was placed on the surface of each catalyst layer thus produced. Further, a rubber gasket was fitted to the exposed part of the polymer electrolyte membrane that is not covered with the carbon paper. The resultant stack was hot pressed to bond the carbon papers and the gasket to the polymer electrolyte membrane. The membrane electrode assembly (MEA) thus produced was sandwiched between an anode-side separator plate and a cathode-side separator plate, to form a unit cell. The anode-side and cathode-side separator plates are made of a graphite plate. The anode-side separator plate has a fuel flow channel composed of a groove on the side opposing the anode of the MEA. The cathode-side separator plate has an oxidant gas flow channel composed of a groove on the side opposing the cathode of the MEA.

Ten unit cells were stacked, and a current collector plate and an insulator plate were attached to each end of the stack. This cell stack was sandwiched between end plates, which were clamped with bolts, nuts, and springs to assemble the fuel cell stack 1.

Using this fuel cell stack 1, a fuel cell system was produced. At the gas detector 5 of this system, the off-gas from the cathode was passed through a glass Dimroth condenser in which ice water was circulated. Thereafter, the carbon dioxide concentration of this off-gas was measured by a carbon dioxide concentration meter of the infrared absorption type (GM70, manufactured by Vaisala k.k.). Simultaneously with this, the flow rate of this off-gas per unit time was measured by a film flow meter (SFVP, manufactured by STEC Inc.). It should be noted that the actual measurement of this flow rate was performed by measuring the time required for the amount of the gas in the measuring container of the flow rate meter to reach a predetermined value.

Used as the current detector 6 was a fuel cell evaluation system manufactured by Chino Corporation, which included an electronic load unit and a current meter. By this current meter, the current outputted by the fuel cell was measured.

Used as the controller 7 was a commercially available personal computer, into which the numerical values outputted from the carbon dioxide concentration meter, the flow rate meter, and the current meter were inputted. The personal computer calculated the amount of fuel consumption by equations (4), (6), and (7), and outputted a signal to the first controlling section 4. In each of the computing equations, the constant "a" is a numerical value obtained from the stoichiometric ratio of methanol to electrons in reaction formula (1) and the Faraday constant, which is $1.72 \times 10^{-6}$ (dimensionless) provided that A is expressed in amperes and X is expressed in mol/s.

In equation (6), the constants "d" and "e" are values obtained experimentally from the measurements of a model cell. Provided that C, D and Y are expressed in molar ratios (dimensionless), $m^3/s$, and mol/s, respectively, d=41 (mol/$m^3$ s) and e=$5.5 \times 10^{-9}$ ($m^3/s$)

By equations (4), (6), (7), and (9), the controller 7 calculated the amount of water consumption and outputted a signal to the second controlling section 9. In calculating X and Y, the same constants were used, and the constants "f" and "g" of equation (9) were values obtained experimentally from the measurements of the model cell. Provided that A and C are expressed in amperes and molar ratios (dimensionless), respectively, and that X, Y, T, and S are expressed in mol/s, f=1.3 (dimensionless) and g=$3.2 \times 10^{-5}$ (dimensionless).

As the first controlling section 4 and the second controlling section 9, a liquid pump capable of changing the flow rate (NP-KX-100, manufactured by NIHON SEIMITSU KAGAKU CO., LTD.) was used.

Used as the fuel tank 2, the dilute tank 3, and the water tank 8 was a sealed container made of polytetrafluoroethylene. Dilute fuel was fed from the dilute tank 3 to the anode of each unit cell, using a liquid pump (NP-KX-120, manufactured by NIHON SEIMITSU KAGAKU CO., LTD.). Air of which flow rate was controlled by a massflow controller was fed to the cathode.

COMPARATIVE EXAMPLE 1

Figure 4:
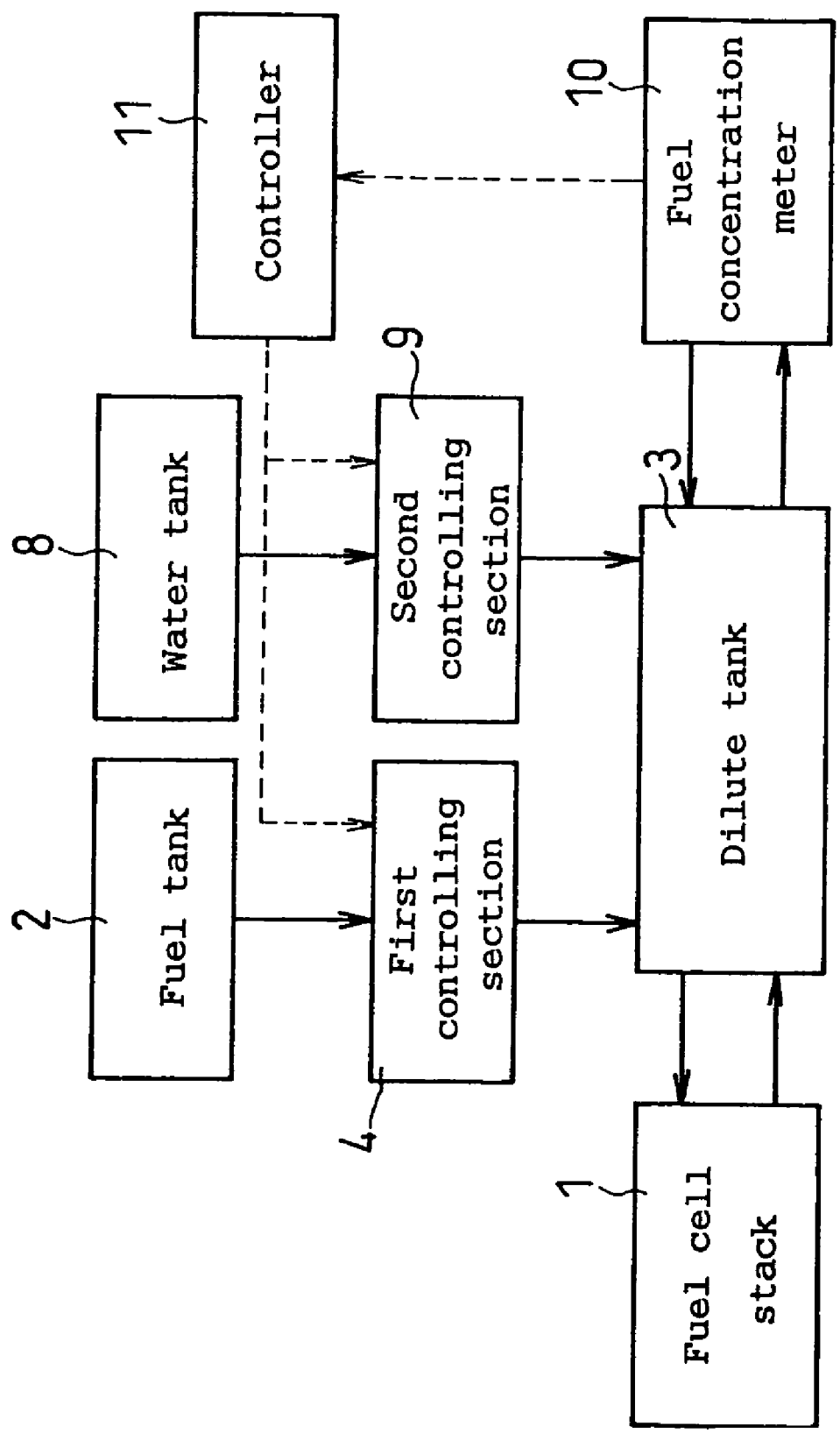
FIG. 4 is a block diagram showing the schematic structure of a fuel cell system in Comparative Example 1.

A fuel cell system as illustrated in FIG. 4 was produced as a comparative example.

In this fuel cell system, a dilute tank 3 which supplies a fuel aqueous solution is connected to a fuel cell stack 1. A fuel tank 2 and a water tank 8 are connected to the dilute tank 3 via a first controlling section 4 and a second controlling section 9, respectively.

The fuel cell stack 1, the fuel tank 2, the dilute tank 3, the first controlling section 4, a controller 11, and the water tank 8, and the second controlling section 9 were the same devices and members as those of Example 1.

A fuel concentration meter 10 connected to the dilute tank 3 was of the ultrasonic type. The concentration value measured by the fuel concentration meter 10 is outputted to the controller 11, which then calculates the difference between the setting value and the measured value and outputs a signal to the first controlling section 4 and the second controlling section 9. In this way, the fuel or water to be fed to the dilute tank is controlled, so that the fuel concentration in the dilute tank 3 is adjusted.

In the same manner as in Example 1, the change in the fuel concentration in the dilute tank with time was measured by a gas chromatograph.

Regarding the fuel cell systems of the foregoing Example 1 and Comparative example 1, the measurement results of the change with time in the concentration of fuel in the dilute tank are shown in FIG. 5. In this figure, reference character 51 represents the change with time in the concentration in Example 1 of the invention, while reference character 52 represents the change with time in the concentration in Comparative Example 1. It should be noted that in the figure, the change in the concentration in Comparative Example 1 is represented by the values measured by a gas chromatograph, not the values measured by a concentration meter. Power was generated at a current density of 100 mA/$cm^2$ under the conditions where the cell temperature was controlled to 60° C. The setting value of the concentration in the dilute tank was 1 mol/l, and the initial value was set to be the same as the setting value. The measurement was performed every 10 minutes during the operation of 8 hours.

FIG. 5 indicates that the system of Example 1 of the invention is stable, with less deviation in the concentration in the dilute tank from the setting value.

In contrast, FIG. 5 shows that in Comparative Example 1, the concentration sharply fluctuates immediately after the start of the operation, and that the deviation from the setting value increases with the passage of time. This sharp fluctuation in the concentration immediately after the start of the operation is thought to be due to the dissolution of the carbon dioxide produced at the anode by power generation into the fuel in the dilute tank, which resulted in measurement errors of the concentration. Such fluctuation is thought to converge when the dissolution of the carbon dioxide reaches saturation. The cause of the increase in the deviation with the passage of time is thought to be the accumulation of the byproducts of the electrode reactions, such as formaldehyde, formic acid, and methyl formate, in the dilute tank, which caused the values measured by the concentration meter to become higher than the actual concentrations.

As described above, the present invention has means for accurately measuring the amounts of fuel and water consumed, and controlling means for supplying the measured amounts of fuel and water from a fuel tank and a water tank to a dilute tank. Accordingly, the present invention makes it possible to maintain and control the concentration of fuel to be supplied to the electrode in a stable manner, and further, to provide a fuel cell system capable of stable output.

Although the invention has been described in terms of the presently preferred embodiments, it is to be understood that such disclosure is not to be interpreted as limiting. Various alterations and modifications will no doubt become apparent to those skilled in the art to which the invention pertains, after having read the above disclosure. Accordingly, it is intended that the appended claims be interpreted as covering all alterations and modifications as fall within the true spirit and scope of the invention.

The invention claimed is:

1. A fuel cell system comprising:
   a fuel cell including a cell that comprises a polymer electrolyte membrane sandwiched between an anode and a cathode;
   means for supplying an oxidant gas to the cathode of said fuel cell;
   a dilute tank that stores an aqueous solution of liquid fuel and circulates said aqueous solution between the anode of said fuel cell and the dilute tank;
   a fuel tank connected to said dilute tank via a first controlling section;
   a water tank connected to said dilute tank via a second controlling section;
   a gas detector that measures a component of a gas discharged from the cathode of said fuel cell and outputs a measured result;
   a current detector that measures the amount of power generated by said fuel cell and outputs a measured result; and
   a controller that controls said first controlling section and said second controlling section based on the results outputted by said gas detector and said current detector,
   wherein the gas detector is capable of determining the amount of liquid fuel which has crossed over the polymer electrolyte membrane from the anode to the cathode based on the measured result of gas discharged, and
   wherein the liquid fuel is comprised of methanol, and the gas discharged from the cathode is carbon dioxide.

2. The fuel cell system in accordance with claim 1, wherein said gas detector measures the flow rate of the gas together with the component of the gas and outputs measured results.

3. The fuel cell system in accordance with claim 1, wherein said gas detector measures the concentration of carbon dioxide in the gas.

4. The fuel cell system in accordance with claim 1, wherein said gas detector measures the concentration of oxygen in the gas.

5. The fuel cell system in accordance with claim 1, wherein said gas detector measures the concentration of steam in the gas.

6. The fuel cell system in accordance with claim 1, wherein said gas detector measures the concentration of at least one selected from the group consisting of methanol, formaldehyde, formic acid, and carbon monoxide.

7. The fuel cell system in accordance with claim 3, wherein said gas detector measures the concentration of carbon dioxide by utilizing infrared absorption.

8. The fuel cell system in accordance with claim 1, wherein the fuel is methanol.

9. A fuel cell system comprising:
   a fuel cell including a cell that comprises a polymer electrolyte membrane sandwiched between an anode and a cathode;
   means for supplying an oxidant gas to the cathode of said fuel cell;
   a dilute tank that stores an aqueous solution of liquid fuel and supplies said aqueous solution to the anode of said fuel cell;
   a fuel tank connected to said dilute tank via a first controlling section;
   a water tank connected to said dilute tank via a second controlling section;
   a gas detector that measures a component of a gas discharged from the cathode of said fuel cell and outputs a measured result;
   a current detector that measures the amount of power generated by said fuel cell and outputs a measured result;
   an unspent methanol fuel detector that measures unspent fuel discharged from the anode of said fuel cell and outputs a measured result; and
   a controller that controls said first controlling section and said second controlling section based on the results outputted by said gas detector, said current detector, and said unspent fuel detector.

10. The fuel cell system in accordance with claim 9, wherein said gas detector measures the concentration of carbon dioxide in the gas.

11. The fuel cell system in accordance with claim 9, wherein said gas detector measures the concentration of oxygen in the gas.

12. The fuel cell system in accordance with claim 9, wherein said gas detector measures the concentration of steam in the gas.

13. The fuel cell system in accordance with claim 9, wherein said unspent methanol fuel detector comprises: a combustor that burns the unspent fuel discharged from the anode of the fuel cell; and a second gas detector that measures a component of a gas discharged from said combustor and outputs a measured result.

14. The fuel cell system in accordance with claim 13, wherein said second gas detector measures the concentration of carbon dioxide in the gas.

15. The fuel cell system in accordance with claim 9, wherein said gas detector measures the concentration of at least one selected from the group consisting of methanol, formaldehyde, formic acid, and carbon monoxide.

16. The fuel cell system in accordance with claim 10, wherein said gas detector measures the concentration of carbon dioxide by utilizing infrared absorption.

17. The fuel cell system in accordance with claim 9, further comprising a combustor that burns the unspent fuel discharged from the anode of the fuel cell, wherein the gas discharged from the cathode of said fuel cell is introduced into said combustor, a gas discharged from said combustor is introduced into said gas detector, and said gas detector also serves as said unspent fuel detector.

18. The fuel cell system in accordance with claim 9, wherein said fuel is methanol.

19. A fuel cell system comprising:
   a fuel cell including a cell that comprises a polymer electrolyte membrane sandwiched between an anode and a cathode;
   means for supplying an oxidant gas to the cathode of said fuel cell;
   a dilute tank that stores an aqueous solution of liquid fuel and supplies said aqueous solution to the anode of said fuel cell;
   a fuel tank connected to said dilute tank via a first controlling section;
   a water tank connected to said dilute tank via a second controlling section; and
   controlling means comprising a current detector which measures the amount of the fuel consumed by said fuel cell from the amount of power generated by said fuel cell, said controlling means controlling said first controlling section based on the measured amount of fuel consumption, said controlling means further comprising correcting means for measuring a component of a gas discharged from the cathode of said fuel cell, calculating the amount of the fuel which has crossed over from the anode to the cathode based on the measured component, and correcting the measured amount of fuel consumption based on the calculated amount of the fuel which has crossed over, wherein the gas detector is capable of determining the amount of liquid fuel which has crossed over the polymer electrolyte membrane from the anode to the cathode based on the measured result of gas discharged, and wherein the liquid fuel is comprised of methanol, and the gas discharged from the cathode is carbon dioxide.

20. The fuel cell system in accordance with claim 19, wherein said correcting means measures carbon dioxide in the gas discharged from the cathode of said fuel cell.

21. The fuel cell system in accordance with claim 19, further comprising means for returning the aqueous solution discharged from the anode of said fuel cell and containing unspent fuel to said dilute tank.

22. The fuel cell system in accordance with claim 21, wherein the amount of water consumed by said fuel cell is calculated from the amount measured by said current detector, and said second controlling section is controlled based on the calculated amount of water consumption.

23. The fuel cell system in accordance with claim 19, further comprising: a combustor into which the aqueous solution discharged from the anode of said fuel cell and containing unspent fuel is introduced; and a gas detector which measures a component of a gas discharged from said combustor, wherein the amount of the fuel consumed by said fuel cell is calculated from the amount and the component measured by said current detector and said gas detector.

24. The fuel cell system in accordance with claim 1, wherein the amount of water consumed by the fuel cell is calculated from the output of the current detector.

* * * * *